United States Patent
Dall'Era et al.

(10) Patent No.: US 9,643,727 B2
(45) Date of Patent: May 9, 2017

(54) AIRPLANE SEATBACK TRAY TABLE COVER SYSTEM

(71) Applicants: Joseph Eric Dall'Era, Denver, CO (US); Tara Thompson, Denver, CO (US)

(72) Inventors: Joseph Eric Dall'Era, Denver, CO (US); Tara Thompson, Denver, CO (US)

(*) Notice: Subject to any disclaimer, the term of this patent is extended or adjusted under 35 U.S.C. 154(b) by 23 days.

(21) Appl. No.: 14/820,539

(22) Filed: Aug. 6, 2015

(65) Prior Publication Data

US 2017/0036766 A1 Feb. 9, 2017

(51) Int. Cl.
| | | |
|---|---|---|
| *A47C 31/00* | (2006.01) | |
| *B64D 11/06* | (2006.01) | |
| *B60N 2/60* | (2006.01) | |
| *A47G 11/00* | (2006.01) | |
| *B60N 3/00* | (2006.01) | |

(52) U.S. Cl.
CPC ...... *B64D 11/0647* (2014.12); *B64D 11/0638* (2014.12); *A47G 11/004* (2013.01); *B60N 2/60* (2013.01); *B60N 2/6009* (2013.01); *B60N 2/6018* (2013.01); *B60N 3/004* (2013.01); *B64D 11/06* (2013.01)

(58) Field of Classification Search
CPC .... B64D 11/0638; B64D 11/06; B60N 3/004; B60N 2/60; B60N 2/6009; B60N 2/6018; B60N 2/6027; A47G 11/004
USPC ............ 297/219.1, 220, 221, 228.11, 228.1, 297/228.12, 228.13, 229, 146, 163, 297/188.04, 188.07; 128/849; 150/158
See application file for complete search history.

(56) References Cited

U.S. PATENT DOCUMENTS

| | | | |
|---|---|---|---|
| 4,911,493 A | | 3/1990 | Muirhead |
| 5,010,668 A | * | 4/1991 | Zeligson ................ B60N 3/002 40/320 |
| 6,592,179 B1 | * | 7/2003 | Miyazaki ............. B60N 2/4876 297/146 |
| 7,841,658 B1 | | 11/2010 | Marble |
| 7,976,099 B2 | | 7/2011 | Ferrara |
| D677,966 S | | 3/2013 | Natkin |
| 8,459,265 B2 | | 6/2013 | Young |
| D705,581 S | | 5/2014 | Luczak |
| 9,051,087 B1 | | 6/2015 | Daniels |
| 9,352,840 B2 | * | 5/2016 | Schultheis ............. B64D 11/06 |
| 2007/0114143 A1 | | 5/2007 | Miskin |

(Continued)

OTHER PUBLICATIONS

Yu, Jeanne, Understanding How Disease is Transmitted via Air Travel: The Aircraft Cabin Environment, Research on the Transmission of Disease in Airports and on Aircraft: summary of a symposium, Sep. 2009, pp. 5-11, Transportation Research Board Conference Proceedings 47, Washington, D.C, USA.

*Primary Examiner* — Chi Q Nguyen

(57) ABSTRACT

A sanitary airplane seat back barrier system with contiguous material forming a tray table cover, and contiguous material to form a seatback pocket protector and seatback cover. The components are packaged in a folded state to allow positioning as a sleeve on an airline tray table, providing complete coverage of the table with subsequent unfolding of contiguous material to reveal a seatback pocket protector and seatback cover. This creates a contiguous sanitary barrier for an airline tray table and the surrounding surfaces known to commonly have microorganism contamination.

10 Claims, 8 Drawing Sheets

(56) References Cited

U.S. PATENT DOCUMENTS

| | | |
|---|---|---|
| 2007/0210629 A1 | 9/2007 | Berge |
| 2007/0257533 A1 | 11/2007 | Resendez |
| 2012/0020586 A1 | 1/2012 | Gilbert |
| 2012/0067474 A1 | 3/2012 | Fellema |
| 2013/0152946 A1 | 6/2013 | Sosnowski |
| 2014/0014006 A1 | 1/2014 | Clatterbuck |
| 2014/0377499 A1 | 12/2014 | Davino |
| 2015/0108798 A1* | 4/2015 | Boyer, Jr. .......... B64D 11/0638 297/163 |
| 2016/0016496 A1* | 1/2016 | Lacey .................. B60N 2/60 297/220 |

\* cited by examiner

AIRPLANE SEATBACK TRAY TABLE COVER SYSTEM

CROSS REFERENCE TO RELATED APPLICATIONS

N/A

BACKGROUND OF INVENTION

Prior Art

The following is a table of prior art that presently appears relevant:
U.S. Patents

| Pat. No. | Kind code | Issue Date | Patentee |
| --- | --- | --- | --- |
| 7,976,099 | B2 | Jul. 12, 2011 | Ferrara |
| D677,966 | S | Mar. 19, 2013 | Natkin |
| D705,581 | S | May 27, 2014 | Luczak et al. |
| 8,459,265 | B2 | Jun. 11, 2013 | Young et al. |
| 7,841,658 | B1 | Nov. 30, 2010 | Marble |

U.S. Patent Application Publications

| Publication No. | Kind code | Publication Date | Applicant |
| --- | --- | --- | --- |
| 2014/0377499 | A1 | Dec. 25, 2014 | Davino et al. 7, |
| 2013/0152946 | A1 | Jun. 20, 2013 | Sosnowski |
| 2012/0020586 | A1 | Jun. 26, 2012 | Gilbert |

Airplane Tray Table Cover

The impact of air travel on spread of disease is well known. The advent of air travel has allowed a connection between geographically isolated populations. The unique problem associated with air travel and the spread of disease is the speed by which populations can travel. Since travel can now occur in less time than the generation time of most microbiological agents, disease transmission is greatly enhanced by air travel (Yu et al. Understanding how disease is transmitted by air travel, 2009).

Studies have shown a high prevalence and diversity of microbiological contamination involving airplane passenger cabins, specifically seatback pockets and tray tables. Despite the current practices employed by airlines to disinfect the cabin between flights, multiple strains of biologic agents, including viruses and bacteria, have been shown to persist on surfaces within the passenger cabin space. Further, many of these bacterial isolates are classified as "opportunistic", meaning they are capable of causing clinically significant infections in humans. *Haemophilus influenza, Escherichia coli*, Methicillin Resistant *Staphylococcus Aureus* (MRSA), *Enterococcus*, and *Bacteroides* are common disease causing organisms that have been isolated from multiple surfaces within the airplane cabin, including tray tables and seatback pockets.

The most common origins of these disease-causing organisms are the human gastrointestinal and respiratory tracts. Typical disease transmission patterns allow for surfaces such as an airplane tray table and seatback pocket to become contaminated, or "colonized" by these bacteria. Further, a recent study showed that bacteria such as MRSA and *E. coli* can survive for several days to a week on seatback pockets and tray tables.

Prior art in this area address only coverage of a small portion of the potentially contaminated environment in close proximity to a passenger airline seat. Given fastidious abilities for microbiologic organisms to contaminate clean areas from non-clean areas, coverage of only a tray table alone offers sub-optimal protection from infection. We have found that as a tray table (even if covered) is repositioned back and forth from an open to a stowed position, it will contact the material of the seatback pocket as well as the adjacent seatback leading to contamination. Further, we have found that as a passenger removes and replaces items from the seatback pocket (and often places the removed object on the tray table), this can readily contaminate the tray table surface, even if covered by an external device. Microbiologic agents are known to translocate from one surface to another simply by contact of the two surfaces.

Prior art fails to incorporate a disposable characteristic to airline tray table covers. A cornerstone of microbiologic defense is that the defense is put in place without significant prior contamination, and can be discarded after its use to prevent further disease transmission. We have found that a non-disposable airline tray table cover brought from outside the airplane has a potential to already contain microbiological contaminants. Further, we have found that if the non-disposable tray table cover is brought out of the confines of the airport after its use aboard a commercial airliner, there is a reasonable chance for disease propagation beyond the confines of the airplane and airport.

SUMMARY

In accordance with one embodiment a sanitary airplane seat back barrier system comprises a single piece of disposable material folded in such a way it can be placed as a sleeve over an airline tray table, then unfolded in such a way as to sequentially reveal and place a seatback pocket protector and cover for the portion of the seatback that is in direct contact with the tray table when the table is in a stowed position. In essence, this creates a disposable sanitary barrier against microorganisms found on the most commonly used areas of an airline passenger cabin, including the seatback pocket and tray table.

Advantages

Accordingly several advantages of one or more aspects are as follows:
To provide a sanitary cover for an airline tray table with contiguous coverage of the seatback pocket and back of seat which is in direct contact with the tray table when the table is in a stowed position, that can be packaged with intent for disposable use, that will provide coverage of the tray table, that when placed will allow a passenger to utilize an airline tray table and seatback pocket without direct skin-to-surface contact with the material of the seatback pocket or tray table, and that will allow the passenger to "close" and "open" the tray table without contaminating the tray table cover surface by contact with the seat back. Other advantages of one or more aspects will be apparent from a consideration of the drawings and ensuing description.

DETAILED DESCRIPTION OF DRAWINGS

Figure 2:
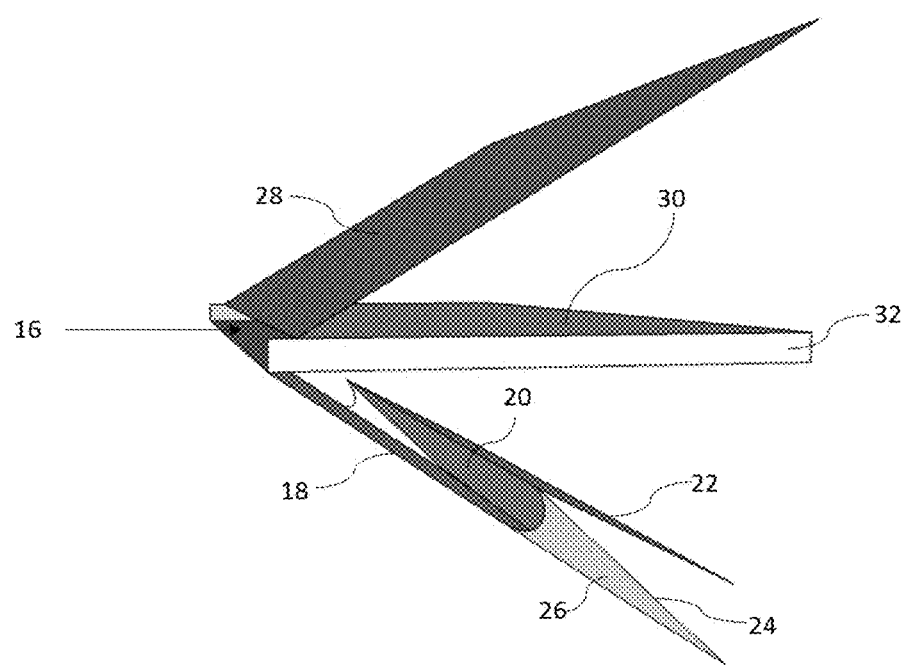
FIG. 2 shows a side view of a sanitary airplane seat back barrier system in a folded position in accordance with one embodiment.

One embodiment is illustrated in FIG. 2. The barrier system contains three components: a tray table cover (30), seatback pocket protector (20), and seatback cover (28); which are folded to allow for sequential unfolding of the three components and placement by the user.

Figure 1:
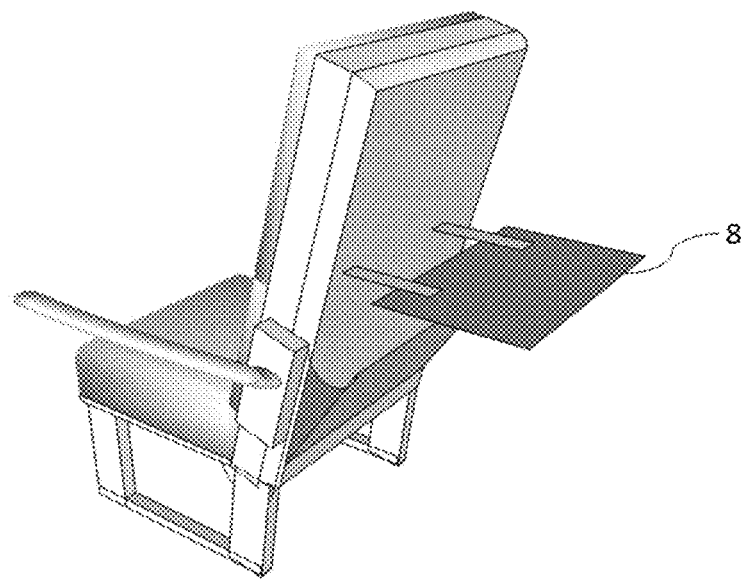
FIG. 1 shows a standard airplane passenger seat back with tray table in an "open" position, seatback pocket, and seatback.

The tray table cover is a sleeve of material with dimensions similar to the existing tray table. The opening of the sleeve (16) is along the back edge of the cover. The width of the opening, top of tray table cover (30), and sides of tray table cover (32) are similar to the dimensions of the existing tray table. The height of the opening (16) is similar to the height of the existing tray table, as shown in FIG. 1 (8).

Figure 8:
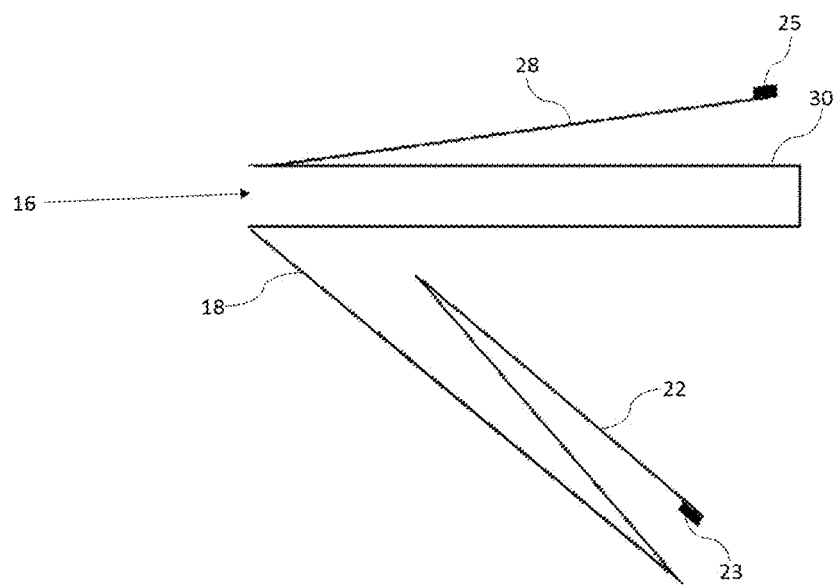
FIG. 8 shows a schematic of a sanitary airplane seat back barrier system illustrating continuity of construction material and location of adhesive material in accordance with one embodiment.

FIG. 2 shows the seatback pocket protector as it is folded along the bottom surface of the tray table cover (30). The seatback pocket protector consists of a pocket of material (20) formed by a front panel (24), side panels (26), and a back panel (18). It is attached to the tray table cover by a seam along the back edge of the bottom surface of the tray table cover. The length of the seam is similar to the length between the hinges of the existing tray table. A front flap of material (22) is a single layer of material contiguous with the top surface of the pocket protector and acts as a barrier to the front surface of the seatback pocket. FIG. 8 shows the bottom edge of the front flap will contain an adhesive strip on the side facing the existing seatback pocket (23)

FIG. 2 shows the seatback cover (28) consists of a single layer of material attached to the tray table cover with a seam along the back edge of the top surface of the tray table cover. FIG. 8 shows the top edge of the seatback cover has an adhesive strip facing the seatback (25).

Operation FIGS. 1,3,4,5,6,7

Figure 3:
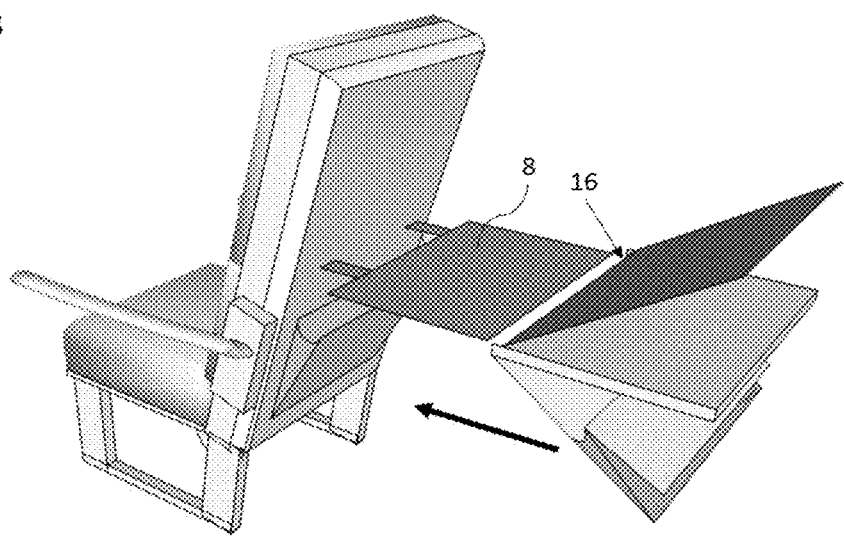
FIG. 3 shows a sanitary airplane seat back barrier system in a folded position in preparation for placement over the existing tray table in accordance with one embodiment.

The manner of using the sanitary seat back barrier system is illustrated in FIGS. 3-7. FIG. 3 shows the sanitary seat back barrier system is placed with the existing tray table in the "open" position (8) by passing the system over the table as a sleeve slid over said tray table from front to back through the open end of the system (16). The tray table cover is kept in place with gravity.

Figure 4:
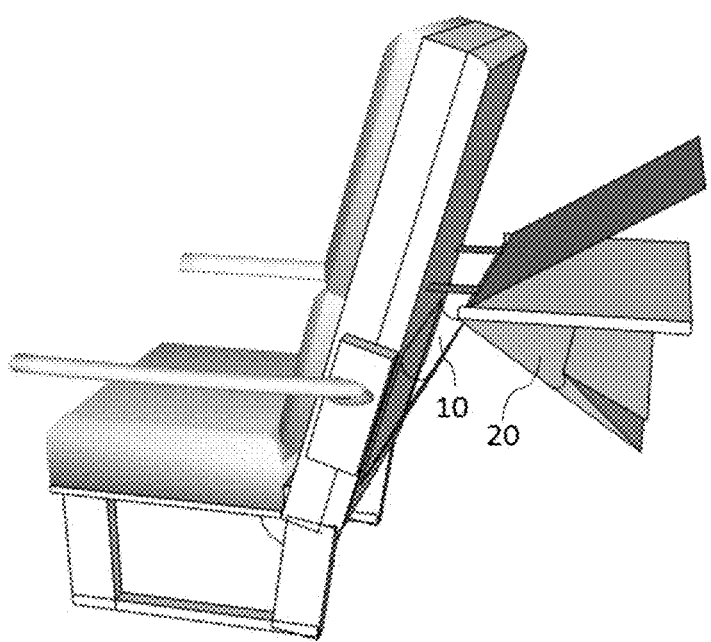
FIG. 4 shows a sanitary airplane seat back barrier system in a folded position placed over the existing tray table in accordance with one embodiment.
Figure 7:
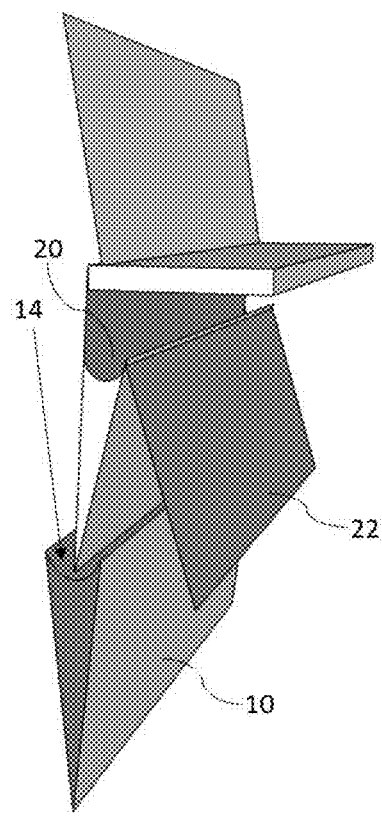
FIG. 7 shows a sanitary airplane seat back system in an unfolded state as the seatback pocket protector component is placed in position within the seatback pocket in accordance with one embodiment.

FIG. 4 shows the seatback pocket protector component (20) as it is unfolded along its seam. When unfolded along the seam, the seatback pocket protector component is placed within the existing seatback pocket (10). FIG. 7 shows the relation between the seatback pocket protector component (20) and the existing seatback pocket (10). The space created by the seatback pocket protector (20) is placed into the space of the existing seatback pocket (14) forming a "pocket within pocket" arrangement. The front flap (22) of material is placed in front of the front surface of the seatback pocket (10) and is adhered to the lower edge of the seatback pocket with the adhesive strip.

Figure 5:
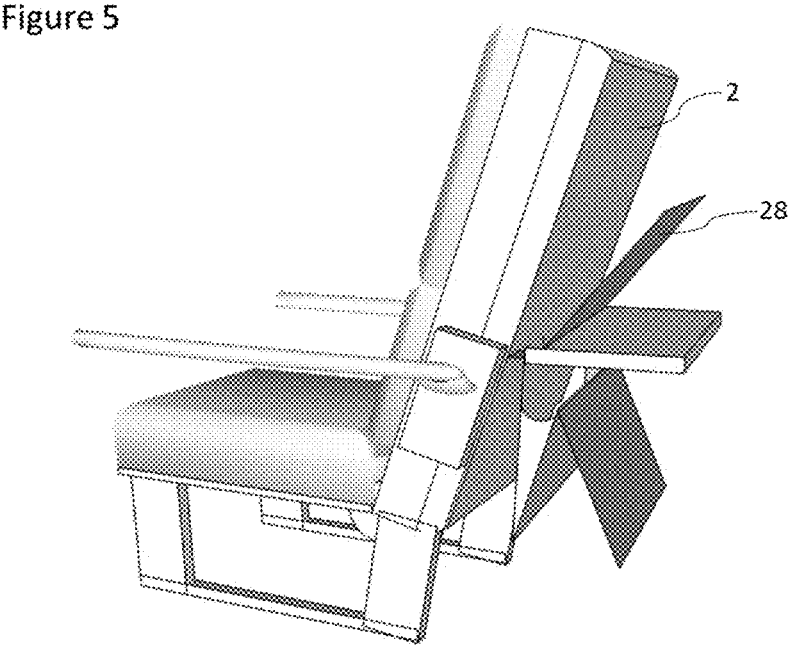
FIG. 5 shows a sanitary airplane seat back barrier system in position over the existing airline tray table with the seatback pocket protector in position and seatback cover in preparation for placement in accordance with one embodiment.
Figure 6:
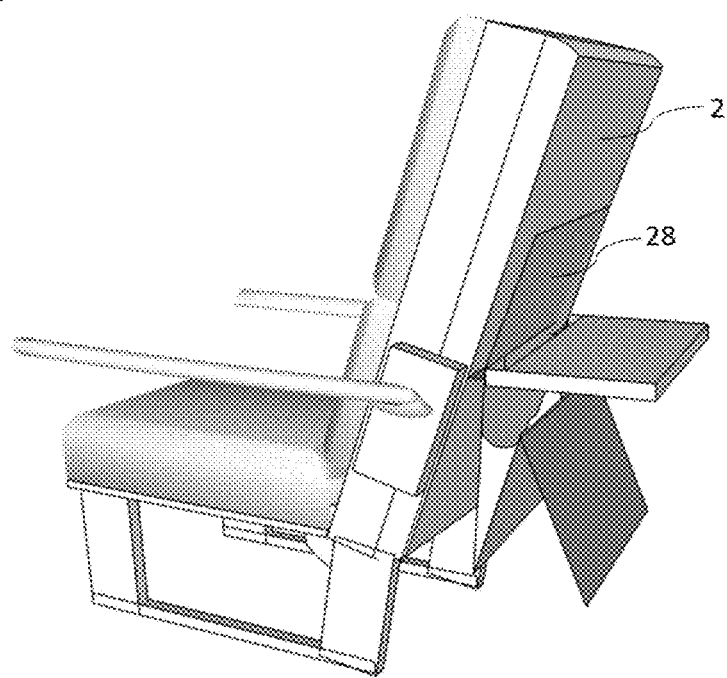
FIG. 6 shows a sanitary airplane seat back barrier system in position over the existing airline tray table with the seatback pocket protector in position and the seatback cover in position in accordance with one embodiment.

FIG. 5 shows the seatback cover (28) is then unfolded upward along its seam towards the seat back (2). FIG. 6 shows the seatback cover component (28) as it is unfolded along the seam, and adhered to the seatback (2) with the adhesive strip.

Alternative Embodiments

Alternative embodiments allow for different possibilities of adherence for the seatback cover to the seatback and the front flap to the front of the seatback pocket. This consists of but is not limited to other adhesive materials and formable plastic strips that can be molded along the edges of the seat.

CONCLUSION, RAMIFICATIONS, AND SCOPE

The sanitary airplane seat back barrier system with tray table cover and seatback pocket protector can be used to create a sanitary cover to protect against microorganisms found on an airplane tray table, seatback pocket, and seatback adjacent to the table when the table is in a "closed" position. The airplane tray cover and seatback pocket protector has the additional advantages in that:

It permits the creation of a contiguous barrier system for multiple components of the airline passenger seat space against microorganisms, including the seatback pocket, tray table, and seatback adjacent to the tray table when the table is in a "closed" position.

It permits for disposable usage, preventing further spread of disease causing microorganisms beyond the airplane and airport.

It provides for a sanitary tray table cover that prevents contamination from the seat back as the table is repositioned from the "closed" to "open" positions.

Although the description above contains several specificities, these should not be construed as limiting the scope of the embodiments but as merely providing illustrations of some of several embodiments. For example, the seatback cover may be omitted, the front flap on the seatback pocket protector may be omitted, the materials used for construction may include, but are not limited to, paper, plastic, elastic, and rubber.

Thus, the scope of the embodiments should be determined by the appended claims and their legal equivalents, rather than by the examples given.

We claim:

1. An airline seatback covering system comprising:
   a. a drape formed to enclose an airline tray table, seatback pocket, and seat back area found adjacent to stowed tray table,
   b. wherein said drape comprises a contiguous material forming a tray table cover component, seatback pocket protector component, and seatback cover component,
   c. wherein said tray table cover component comprises a sleeve of material with rectangular dimensions similar to an airline tray table, wherein said sleeve of material has an open end along one long edge and closed along the other three edges, wherein between the open and closed long ends are disposed a proximal region containing the open long end and a distal region along the closed long end, d. wherein said seatback pocket protector component comprises material contiguous with, or joined at a seam to the bottom, proximal edge of said tray table cover component, e. wherein said seatback pocket protector component comprises a drape forming a pocket cavity with dimensions similar to a standard airline seatback pocket, wherein said seatback pocket protector will fit within standard seatback pocket and remain in place with gravity, f. wherein a front flap component comprises a single layer of drape adjoined to by a seam, or contiguous with the top outer edge of the seatback pocket protector to overlay the outer portion of seatback pocket, g. wherein said seatback cover component is a single layer of material contiguous with, or joined at a seam to the top proximal edge of said tray table cover component, h. wherein said seatback pocket component and seatback cover component are folded along the bottom and top faces, respectively of said tray table cover component to form a compact system, i. wherein said compact system retained on an airline tray table by way of said tray table cover component, wherein said seatback pocket protector component and seatback cover component successively unfolded to reveal a, contiguous drape system.

2. The airline seatback covering system of claim 1 composed of disposable material.

3. The airline seatback covering system of claim 1, wherein seatback cover component is omitted.

4. The airline seatback covering system of claim 1, wherein front flap component is omitted.

5. The airline seatback covering system of claim 1, wherein said drape is composed of liquid impermeable material.

6. The airline seatback covering system of claim 1, wherein said drape is composed of materials paper, plastic, elastic, cotton, polyester, or rubber.

7. The airline seatback covering system of claim 1, wherein said seatback cover component contains adhesive material at top portion facing seat back.

8. The airline seatback covering system of claim 1, wherein said front flap component contains adhesive material at bottom portion facing front surface of seatback pocket.

9. The airline seatback covering system of claim 1, wherein said seatback pocket protector component and front flap component are omitted.

10. The airline seatback covering system of claim 1, wherein said seatback cover component, front flap component, and seatback pocket protector component are omitted.

\* \* \* \* \*